(12) United States Patent
Chen et al.

(10) Patent No.: US 7,962,507 B2
(45) Date of Patent: Jun. 14, 2011

(54) WEB CONTENT MINING OF PAIR-BASED DATA

(75) Inventors: Weizhu Chen, Beijing (CN); Long Jiang, Beijing (CN); Ming Zhou, Beijing (CN); Benyu Zhang, Biejing (CN); Zheng Chen, Beijing (CN); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 844 days.

(21) Appl. No.: 11/941,968

(22) Filed: Nov. 19, 2007

(65) Prior Publication Data
US 2009/0132530 A1    May 21, 2009

(51) Int. Cl.
*G06F 17/30* (2006.01)
*G06F 7/00* (2006.01)

(52) U.S. Cl. ......... 707/769; 707/708; 707/728; 707/754
(58) Field of Classification Search ........................ None
See application file for complete search history.

(56) References Cited

U.S. PATENT DOCUMENTS

| | | | |
|---|---|---|---|
| 4,712,174 A | 12/1987 | Minkler | |
| 4,942,526 A | 7/1990 | Okajima | |
| 5,721,939 A | 2/1998 | Kaplan | |
| 5,805,832 A | 9/1998 | Brown | |
| 5,806,021 A | 9/1998 | Chen | |
| 5,930,746 A | 7/1999 | Ting | |
| 5,946,648 A | 8/1999 | Halstead | |
| 6,002,997 A | 12/1999 | Tou | |
| 6,173,252 B1 | 1/2001 | Qiu | |
| 6,289,302 B1 | 9/2001 | Kuo | |
| 6,311,152 B1 | 10/2001 | Bai | |
| 6,385,629 B1 | 5/2002 | Sundaresan et al. | |
| 6,408,266 B1 * | 6/2002 | Oon | 704/1 |
| 6,505,197 B1 | 1/2003 | Sundaresan et al. | |
| 6,539,376 B1 | 3/2003 | Sundaresan et al. | |
| 6,647,395 B1 | 11/2003 | Kurzweil | |
| 6,941,262 B1 | 9/2005 | Kurzweil | |
| 6,993,534 B2 | 1/2006 | Denesuk et al. | |
| 7,113,903 B1 | 9/2006 | Riccardi | |
| 7,117,208 B2 | 10/2006 | Tamayo et al. | |
| 7,184,949 B2 | 2/2007 | Kurzweil | |
| 7,219,099 B2 | 5/2007 | Kuntala et al. | |
| 7,269,802 B1 | 9/2007 | Kurzweil | |

(Continued)

FOREIGN PATENT DOCUMENTS

EP    1587012 A2    10/2005

OTHER PUBLICATIONS

Joshi, et al.,"Robust Fuzzy Clustering Methods to Support Web Mining", University of Missouri.

(Continued)

*Primary Examiner* — Greta L Robinson
*Assistant Examiner* — James J Wilcox
(74) *Attorney, Agent, or Firm* — L. Alan Collins; Collins & Collins Incorporated

(57) ABSTRACT

Described herein is technology for, among other things, mining pair-based data on the web. The technology involves an online pair-based data mining system as well as an offline SVM training system. By subjecting a pair-based input data to the systems, one may grow a pool of pair-based data which share characteristics of the pair-based input data in more efficient manner.

19 Claims, 5 Drawing Sheets

U.S. PATENT DOCUMENTS

| | | | |
|---|---|---|---|
| 2002/0052901 A1 | 5/2002 | Guo | |
| 2002/0099712 A1* | 7/2002 | Brandin et al. | 707/100 |
| 2002/0123877 A1 | 9/2002 | Xun | |
| 2003/0036040 A1 | 2/2003 | Kurzweil | |
| 2003/0083861 A1 | 5/2003 | Weise | |
| 2003/0208354 A1 | 11/2003 | Lin | |
| 2004/0006466 A1 | 1/2004 | Zhou | |
| 2004/0034525 A1 | 2/2004 | Pentheroudakis | |
| 2004/0122660 A1 | 6/2004 | Cheng | |
| 2004/0215598 A1 | 10/2004 | Bala | |
| 2005/0071148 A1 | 3/2005 | Huang | |
| 2005/0080781 A1 | 4/2005 | Ryan | |
| 2005/0210058 A1 | 9/2005 | Kurzweil | |
| 2006/0026152 A1* | 2/2006 | Zeng et al. | 707/5 |
| 2007/0005345 A1* | 1/2007 | Zhou et al. | 704/10 |
| 2007/0100680 A1 | 5/2007 | Kumar et al. | |
| 2007/0204211 A1 | 8/2007 | Paxson | |
| 2007/0294223 A1 | 12/2007 | Gabrilovich | |
| 2008/0154580 A1 | 6/2008 | Jiang | |

OTHER PUBLICATIONS

Wang, et al., "ReCoM: Reinforcement Clustering of Multi-Type Interrelated Data Objects", Proceedings of the 26th annual international ACM SIGIR conference on Research and development in informaion retrieval, Date: 2003, pp. 274-281, ACM, New York, USA.

Richardson, "Achieving commercial-quality translation with example-based methods", 2001.

Mamede, "Poetry Assistant", Oct. 2004.

Harrell, "Walking Blues Changes Undersea: Imaginative Narrative in Interactive Poetry Generation with the GRIOT System", Jul. 2006.

Yamamoto, "Machine Translation by Interaction Between Paraphraser and Transfer", Proc 19th IC on Computational Linguistics, 2002.

Dien, "Vietnamese Word Segmentation", 2001.

Haizhou, "Chinese Word Segmentation", 1998.

Lou, "Covering Ambiguity Resolution in Chinese Word Segmentation Based on Contextual Information", 2002.

Palmer, "Chinese Word Segmentation and Information Retrieval", 1997.

Shen, "Descriminitive Reranking for Machine Translation", 2004.

Manurung, "An evolutionary algorithm approach to poetry generation", 2003.

Ray Kurzweil's Cybernetic Poet: How It Works (http://www.kurzweilcyberart.com/poetry/rkcp_how_it_works.php), 2000.

Doddington, "Automatic Evaluation of Machine Translation Quality Using N-gram Co-Occurance Statistics", 2002.

Songhua, "Automatic Artistic Calligraphy Generation", May 2003.

\* cited by examiner

WEB CONTENT MINING OF PAIR-BASED DATA

BACKGROUND

Web mining is the application of data mining techniques to discover patterns from the web. The web mining may be divided into a web usage mining, web content mining or web structure mining. The web content mining is a process to discover useful information from the content of a web page. The useful information may include text, image, audio or video data.

Text mining refers to the process of deriving high quality information from text. In general, a web search engine may be used for the text mining. The web search engine searches for information on the World Wide Web based on a search term. The search engine may return search results which may contain a part or all of the search terms. Additionally, a filter may be used to refine the search result.

However, the web search engine and/or filter may not be effective when a user is looking for data which has a particular pair-based relationship to the search term. For example, the user may be looking to obtain a lower part (e.g., a first sentence) of a Chinese couplet when he or she enters a search term containing an upper part (e.g., a second sentence) of the Chinese couplet which goes together with the lower part. In this case, the search results, which simply list any web text containing the upper part, may not be adequate. The search result may be too abundant and random, so the user may have to spend time to sort the search results to obtain some useful lower parts which can go with the upper part.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Described herein is technology for, among other things, mining pair-based data on the web. The associated online pair-based data mining system and offline SVM training system are also disclosed herein. The technology may be implemented via a web page.

The technology involves web-mining pair-based data based on a query by a user, where the query is pair-based data. Once the query is entered by the user, a search result produced by a search engine is parsed to generate a snippet set. The snippet set is then subjected to a filter to generate one or more pair-based candidate data. The pair-based candidate data are then subjected to a support vector machine classifier. The support vector machine classifier is trained offline with manually labeled pair-based data having features or characteristics unique to the pair-based data. Once the training is completed, the support vector machine classifier classifies the pair-based candidate data, thus generating one or more pair-based output data.

Thus, embodiments provide technology for extracting pair-based data on the web. The techniques and tools described herein provide for efficient data mining of the pair-based data. Such technology is ideal for a web application and/or a search application catered toward extracting pair-based data on the World Wide Web. Because of the efficiency of the technology described herein, it is possible for extracting a pool of pair-based data available on the web that are more precisely associated with a search term.

BRIEF DESCRIPTION OF THE DRAWINGS

The accompanying drawings, which are incorporated in and form a part of this specification, illustrate embodiments and, together with the description, serve to explain their principles.

DETAILED DESCRIPTION

Figure 1:
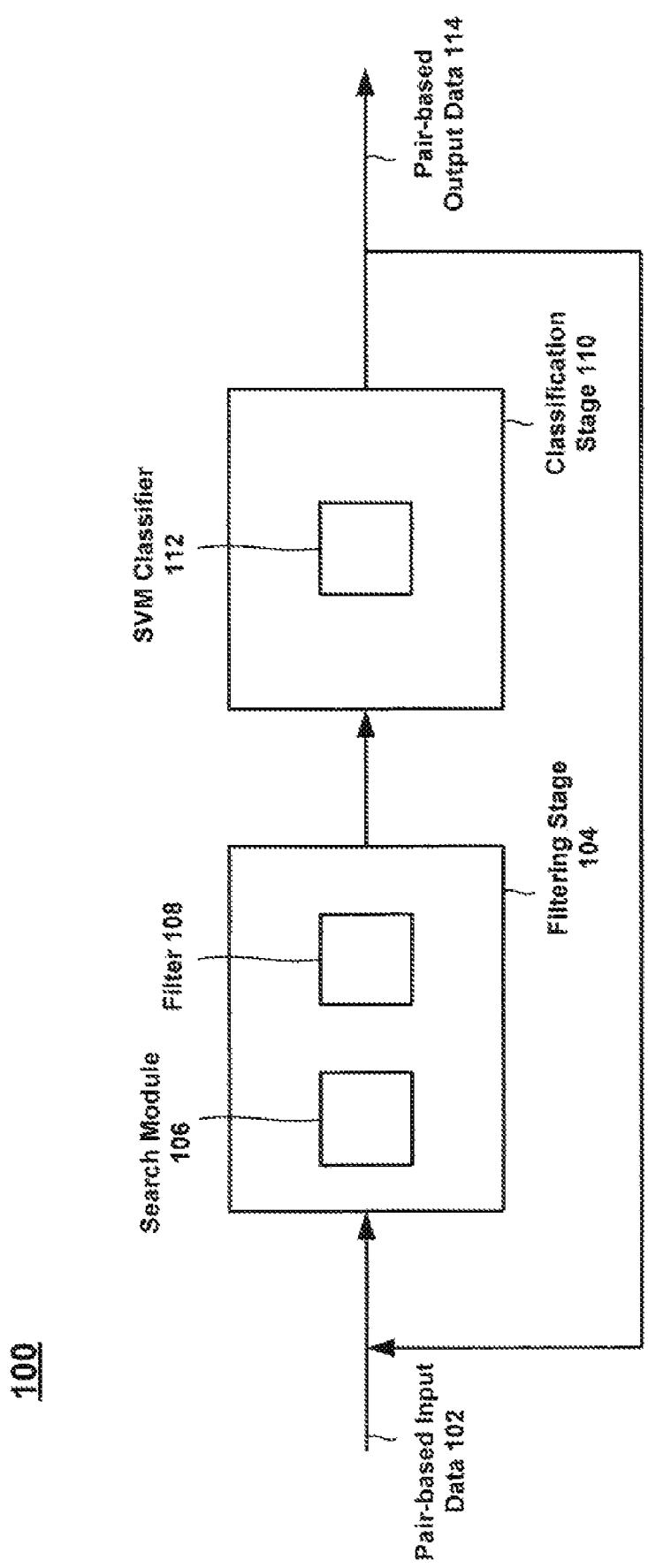
FIG. 1 is a block diagram of an exemplary computing system environment for implementing embodiments.

Reference will now be made in detail to the preferred embodiments of the claimed subject matter, examples of which are illustrated in the accompanying drawings. While the invention will be described in conjunction with the preferred embodiments, it will be understood that they are not intended to limit the claimed subject matter to these embodiments. On the contrary, the claimed subject matter is intended to cover alternatives, modifications and equivalents, which may be included within the spirit and scope of the claimed subject matter as defined by the claims. Furthermore, in the detailed description of the present invention, numerous specific details are set forth in order to provide a thorough understanding of the claimed subject matter. However, it will be obvious to one of ordinary skill in the art that the claimed subject matter may be practiced without these specific details. In other instances, well known methods, procedures, components, and circuits have not been described in detail as not to unnecessarily obscure aspects of the claimed subject matter.

Some portions of the detailed descriptions that follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the claimed subject matter.

It should be borne in mind, however, that all of these terms are to be interpreted as referencing physical manipulations and quantities and are merely convenient labels and are to be interpreted further in view of terms commonly used in the art.

Unless specifically stated otherwise as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

Described herein is technology for, among other things, web-mining pair-based data based on a pair-based data seed. The associated filtering and/or classification schemes are also disclosed herein. The technology may be implemented via a web page.

The technology involves the generation of pair-based output data based on a pair-based input data from a user. During the process, a pool of the pair-based output data is generated by subjecting the pair-based input data to a search engine, a parser, a filter, and a support vector machine.

FIG. 1 is a block diagram of an exemplary computing system environment for implementing embodiments. With reference to FIG. 1, an exemplary system for implementing embodiments includes a general purpose computing system environment, such as computing system environment 100. Pair-based data include two parts: a first item and a second item. The two items may have an objective relationship (e.g., a semantic relationship found in a Chinese couplet and/or a translated term).

As illustrated in FIG. 1, a pair-based input data 102 (e.g., the first item or the second item) may be subject to a filtering stage 104 and a classification stage 110 to generate one or more pair-based output data 114. The filtering stage 104 includes a search module 106 and a filter 108. The search module 106 may produce a search result when the pair-based input data 102 is processed. The output of the search module 106 may be processed through the filter 108 to generate an input to the classification stage 110. The classification stage 110 includes a support vector machine (SVM) classifier 112. The SVM classifier 112 generates the pair-based output data 114.

Figure 2:
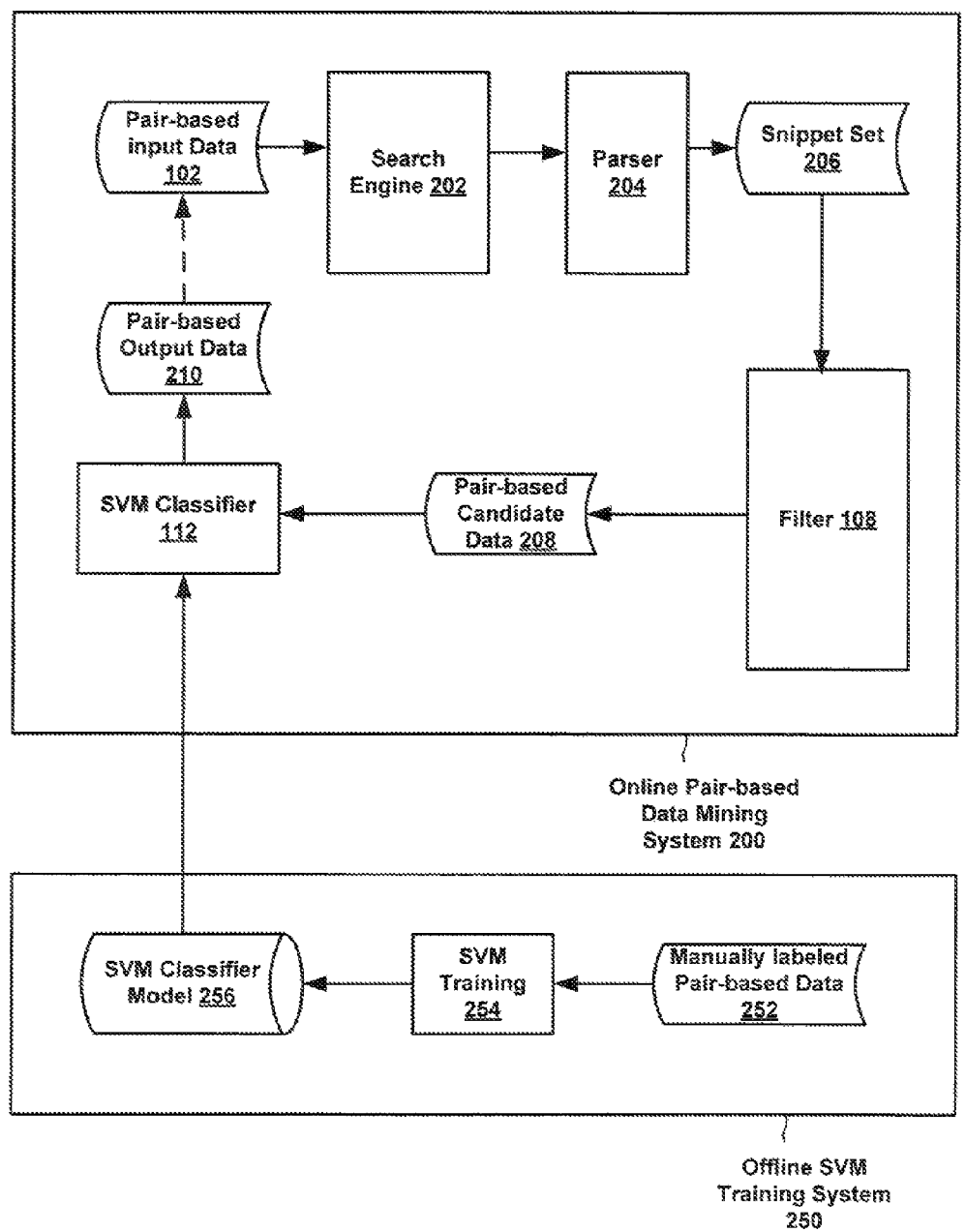
FIG. 2 is a block diagram of an exemplary online pair-based data mining system aided by an offline SVM training system for implementing embodiments.

FIG. 2 is a block diagram of an exemplary online pair-based data mining system 200 aided by an offline SVM training system 250 for implementing embodiments. As illustrated in FIG. 2, a pair-based input data 102 is prepared as a part of a pair-based data seed. For the pair-based data seed, there may be two items—the pair-based input data 102 and its counterpart. The pair-based input data 102 is processed as a query to a search engine 202 to generate a search result. The search engine may include a MSN Search Web®, Google®, Yahoo®, Baidu®, and any other search engine. Then, the search result is parsed (e.g., by using a parser 204) to extract a snippet set 206. The snippet set 206 may be one or more short excerpts of the text that match the query (e.g., the pair-based input data 102). Alternatively, the snippet set 206 may provide information associated with the query and/or ideas for terms to use in subsequent searches.

The snippet set 206 is then subject to the filter 108 to generate one or more pair-based candidate data. The filter 108 may be based on a number of criteria to generate the pair-based candidate data 208. In order to obtain high precision pair-based output data 210, the pair-based candidate data 208 are subject to a classification stage. The classification stage comprises an offline process as well as an online process. During the offline and online processes, the support vector machine (SVM) classifier 112 is used to classify the pair-based candidate data 208.

It is appreciated that the SVM classifier 112 is well-known to those skilled in the art of machine learning. The SVM classifier 112 may be a learning machine that attempts to maximize the margin between sets of data. The SVM classifier 112 may classify a given input of data without explicitly being told what features separate the classes of data. This may be necessary because humans are often unable to distinguish which features set two sets of data apart when there are hundreds or possibly thousands of different features that make up the data. The SVM classifier 112 may separate the pair-based candidate data 208 into positive candidate data and negative candidate data.

For the SVM classifier 112 to function properly, a training of the SVM classifier 112 may be necessary. The offline SVM training system 250 is used to generate a SVM classifier model 256 by conducting a training which subject manually labeled pair-based data 252. Positive examples of the manually labeled pair-based data 252 may share features unique to the pair-based input data 102. Then, the SVM classifier model 256 obtained by the SVM training 254 is loaded to the SVM classifier 112. Based on the SVM classifier model 256, the SVM classifier 112 classifies the pair-based candidate data 208, thus generating the pair-based output data 210 (e.g., by keeping the positive candidate data while dropping the negative candidate data).

One or more of the pair-based output data 210 may be subject to the online pair-based based data mining system 200 as the pair-based input data 102 to generate additional pair-based output data 210. Additionally, a counterpart of the pair-based input data 102 may be subjected to the online pair-based data mining system 200 and the offline SVM training system 250 to mine more pair-based output data 210. In one example embodiment, the pair-based input data may be a term in a first language, and the counterpart may be a foreign term which corresponds (e.g., semantically) to the term in the first language.

In one example embodiment, the online pair-based data mining system 200 and the offline SVM training system 250 may be used to generate one or more new sentences suitable for a Chinese couple by subjecting a seed of the Chinese couplet to the systems. The Chinese couplet includes two sentences written as calligraphy on vertical red banners, typically placed on either side of a door or in a large hall. Such couplets are often displayed during special occasions such as weddings or during the Chinese New Year. Other types of couplets include birthday couplets, elegiac couplets, decoration couplets, professional or other human association couplets, and the like.

Chinese couplets use condensed language, but have deep and sometimes ambivalent or double meaning. The two sentences making up the Chinese couplet are called a "first sentence" and a "second sentence." An example of the Chinese couplet is "海阔凭鱼跃"and "天高任鸟飞,"where the first sentence is "海阔凭鱼跃"and the second sentence is "天高任鸟飞."The correspondence between individual words of the first and second sentences is shown as follows:

天 (sky)　　　　　　海 (sea)
高 (high)　　　　　　阔 (wide)

-continued

| 任 (enables) | 凭 (allows) |
| 鸟 (bird) | 鱼 (fish) |
| 飞 (fly) | 跃 (jump) |

The Chinese couplet can be of different length. A short couplet can include one or two Chinese characters while a longer couplet can reach several hundred Chinese characters. The Chinese couplets can also have diverse forms and/or meanings. For instance, one form of the Chinese couplet may include the first and second sentences having the similar meaning. Another form of the Chinese couplet may include the sentences having the opposite meaning.

In general, the Chinese couplet conforms to the following rules or principles: First, The two sentences of the Chinese couplet have the same number of words and/or characters. Each Chinese character has one syllable when spoken. Each Chinese word can have one or more characters, and consequently, be pronounced with one or more syllables. Each word of the first sentence should have the same number of Chinese characters as the corresponding word of the second sentence.

Secondly, tones of the Chinese couplet are generally coinciding and harmonious. The traditional custom is that the character at the end of first sentence should be pronounced in a sharp downward tone. The character at the end of the second sentence should be pronounced with a level tone.

Third, the sequence of parts of speech in the second sentence should be identical to the sequence of parts of speech in the first sentence. For instance, the position of a noun in the first sentence should correspond to the same position as the noun in the second sentence.

Fourth, the content of the second sentence should be mutually inter-related with the first sentence but cannot be duplicated.

Fifth, the writing styles of the two sentences should be same. For instance, if there is repetition of words, or characters, or pronunciation in the first sentence, there should be a same sort of repetition in the second sentence. And if a character is composed of two other characters or more in the first sentence, there should be a character that is composed of the same number of characters in the second sentence.

The seed for the Chinese couplet may be the first sentence and/or the second sentence. When the first sentence is subject to the search engine 202, a search result may be obtained. The search result is then processed by using the parser 204 to generate the snippet set 206 associated with the first sentence of the Chinese couplet. The snippet set 206 is subject to the filter 108 which passes through a subset of the snippet set 206 conforming to the features of the Chinese couplet.

Figure 3:
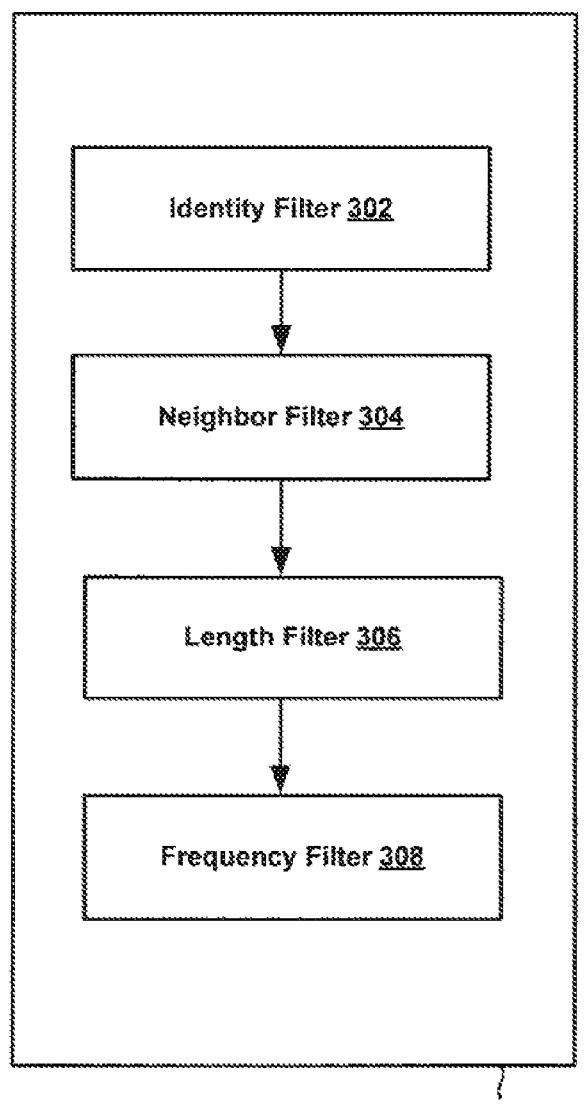
FIG. 3 is a block diagram of an exemplary filter used for the online pair-based data mining system of FIG. 2, in accordance with an embodiment.

FIG. 3 is a block diagram of an exemplary filter used for the online pair-based data mining system 250 of FIG. 2, in accordance with an embodiment. As illustrated in FIG. 3, the filter 108 may include an identity filter 302, a neighbor filter 304, a length filter 306, and a frequency filter 308. The identity filter 302 is used to check to see if each of the snippet set contains at least the first sentence. That is to say, in each of the snippet set, there should at least one candidate pair with its first sentence matching the query (e.g., the first sentence of the pair-based data seed). If this turns out to be true in a snippet, the particular snippet is regarded as a good snippet for extracting pair candidates; otherwise the snippet is discarded.

For the good snippet, the text may be divided into sentences based on a punctuation mark and/or arranged in an orderly manner. Then, the sentences may be paired up to form sentence pairs. The neighbor filter 304 passes through only the neighboring sentences in pairs and/or discard the rest.

The length filter 306 is used to discard those neighboring sentences in pairs which do not have the same length for both the first sentence and the second sentence. For all the candidate pairs of neighboring sentences generated, those with its frequency less than a threshold k (e.g., k=2) in the snippet set are discarded (e.g., by using the frequency filter 308).

In the offline SVM training system 250, the SVM training 254 is conducted by subjecting the SVM classifier 112 to manually labeled Chinese couplets. Features unique to the Chinese couplet (e.g., a sentence length, a tone, a sequence, a content, and a writing style of the Chinese couplet) may be used in the SVM training 254. A SVM classifier model associated with the Chinese couplet may be generated based on the SVM training 254 and/or loaded to the SVM classifier 112. The SVM classifier 112 is then used to classify the candidate sentences into positive candidate sentences or negative candidate sentences. The positive candidate sentences are regarded as high-quality candidate sentences, and/or used as pair-based data seeds (e.g., or used in the SVM training 254).

A client may harvest a list of sentences suitable for a Chinese couplet by iterating the processes described in the online pair-based data mining system 250 and/or the offline SVM training system 250 (e.g., by using the second sentence of the Chinese couplet). The claimed subject matter is described in terms of these example environments. Description in these terms is provided for convenience only. It is not intended that the invention be limited to application in this example environment. In fact, after reading the following description, it will become apparent to a person skilled in the relevant art how to implement the claimed subject matter in alternative embodiments.

Table 1 illustrates the improvement in the accuracy of mining candidate sentences suitable for a Chinese couplet when the method and/or tool described by the online pair-based data mining system 200 and/or the offline SVM training system 250 is implemented.

TABLE 1

| | Top-1 Precision | Top-3 Precision | Top-5 Precision | Top-10 Precision |
|---|---|---|---|---|
| conventional mining technique | 6.22% | 14.07% | 19.35% | 35.00% |
| with the system(s) | 17.05% | 37.32% | 32.64% | 88.5% |
| difference | +10.83% | +23.25% | +13.29% | +53.50% |

As shown in table 1, there was 53.5% improvement in top-10 precision (e.g., the first ten sentences generated which meet the criteria of being a suitable lower part of a Chinese couplet to the upper part being queried), 13.29% improvement in top 5 precision, and 10.83% improvement in top-1 precision when the method and/or system described in FIGS. 2 and 3 were used in place of the conventional mining technique.

Figure 4:
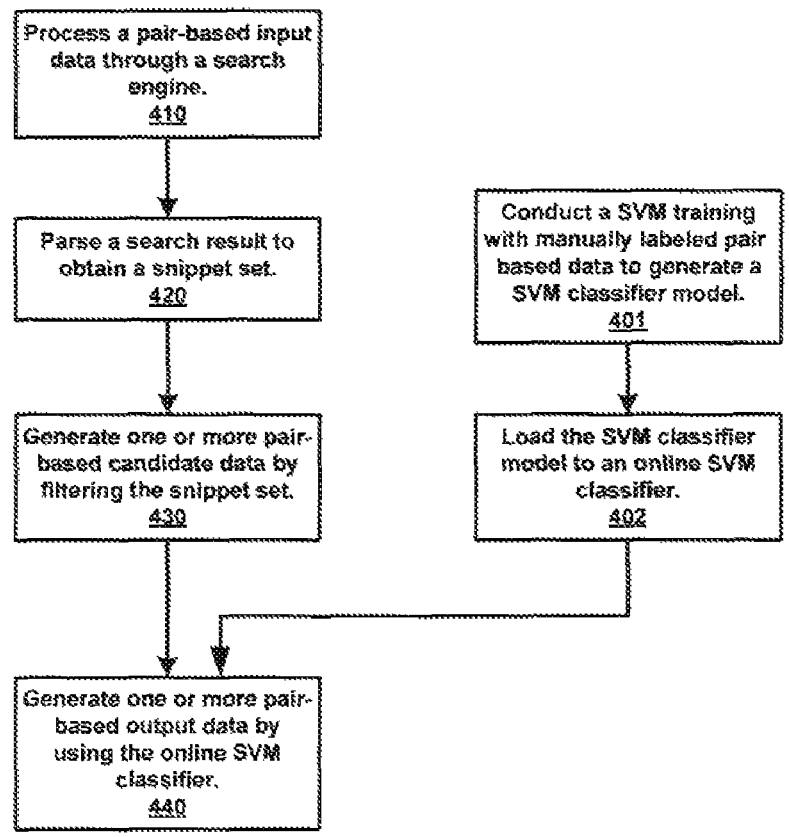
FIG. 4 is a flowchart of an exemplary process for generating pair-based output data, in accordance with an embodiment.

FIG. 4 is a flowchart of an exemplary process for generating pair-based output data, in accordance with an embodiment. It is appreciated that not all steps of process 400 are necessary for the general goal of process 400 to be achieved. Moreover, it is appreciated that additional steps may also be included in process 400 in accordance with alternative embodiments.

Process 400 begins at step 401 where a SVM training is conducted with manually labeled pair-based data to generate a SVM classifier model. At step 402, the SVM classifier is loaded to an online SVM classifier. At step 410, a pair-based input data is processed through a search engine. At step 420, a search result is parsed to obtain a snippet set. At step 430, one or more pair-based candidate data are generated by filtering the snippet set. At step 440, one or more pair-based output data are generated by using the online SVM classifier.

In one example embodiment, the process described in FIG. 4 may be embedded in a computer readable medium such that when the computer readable medium is executed by a computer causes the computer to perform the process comprising generating a set of snippets by parsing a search result of a pair-based input data, subjecting the set of snippets to one or more filters to generate one or more pair-based candidate data (e.g., where the filter is associated with characteristics of the pair-based input data) and generating one or more pair-based output data by classifying the pair-based candidate data with a support vector machine classifier.

Figure 5:
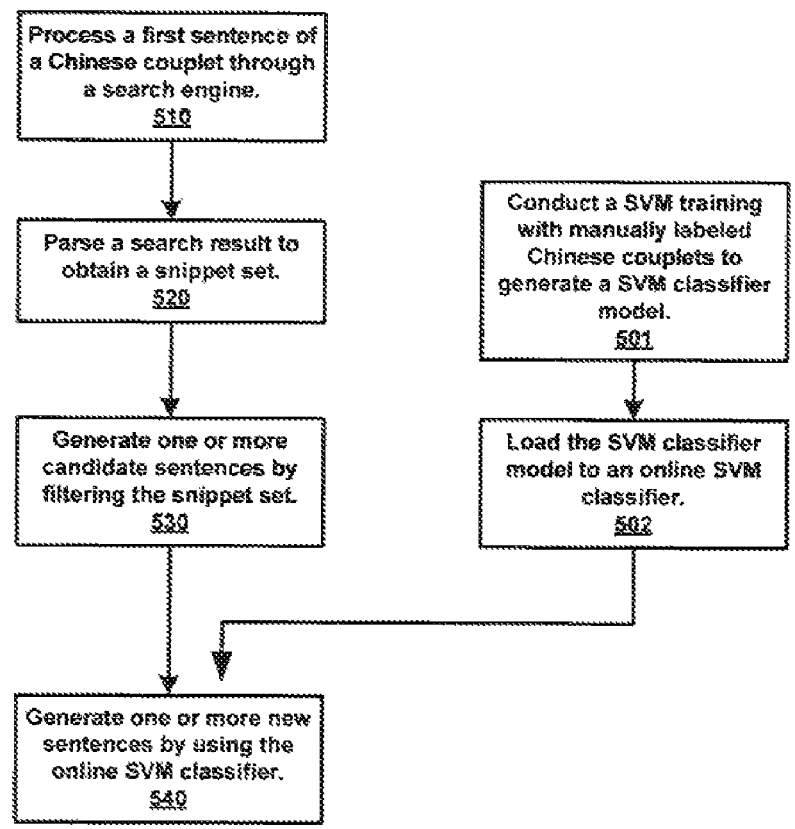
FIG. 5 illustrates is a flowchart of an exemplary process for generating sentences suitable for Chinese couplet, in accordance with an embodiment.

FIG. 5 illustrates is a flowchart of an exemplary process for generating sentences suitable for Chinese couplet, in accordance with an embodiment. It is appreciated that not all steps of process 500 are necessary for the general goal of process 500 to be achieved. Moreover, it is appreciated that additional steps may also be included in process 500 in accordance with alternative embodiments.

Process 500 begins at step 501 where a SVM training is conducted with manually labeled Chinese couplets to generate a SVM classifier model. At step 502, the SVM classifier is loaded to an online SVM classifier. At step 510, a first sentence of a Chinese couplet is processed through a search engine. At step 520, a search result is parsed to obtain a snippet set. At step 530, one or more candidate sentences for the Chinese couplet are generated by filtering the snippet set. At step 540, one or more new sentences suitable for the Chinese couplet are generated by using the online SVM classifier.

Thus, embodiments provide technology for performing web-mining pair-based data. The techniques, methods and/or tools described herein provide for filtering and classifying candidate data to generate more precise pair-data meeting the criteria set by the user. Such technology is ideal to generate pair-based data available on the web. Because of the efficiency of the technology described herein, it is possible for an algorithm implemented based on the technology to mine pair-based data which meets criteria set by the user within a threshold.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for web mining at least one couplet part, the method comprising:
   parsing, by a computer, a search result resulting from a query based on a search term comprising a first part of a couplet comprising the first part and a second part, wherein each of the first part and the second part include at least one character or word, and wherein the parsing results in a snippet set wherein each snippet in the set comprises at least one returned character or word that matches the query;
   filtering, by the computer, the resulting snippet set, wherein the filtering results in at least one candidate couplet part; and
   generating, by the computer, at least one output couplet part, wherein the generating comprises classifying, by a support vector machine classifier, the at least one candidate couplet part, wherein the at least one couplet part comprises the generated at least one output couplet part.

2. The method as recited in claim 1 wherein the search result is obtained by processing the search term using a search engine.

3. The method as recited in claim 1 wherein the filtering the resulting snippet set is performed by a filter configured to pass snippets of the resulting snippet set that include the first part of the couplet and that includes a returned second part that has a length that corresponds to the first part of the couplet.

4. The method as recited in claim 1 wherein the filtering comprises training the support vector machine classifier with a set of manually labeled couplet data resulting in a support vector machine classifier model.

5. The method as recited in claim 4 wherein the set of manually labeled couplet data is based on at least one feature unique to the search term.

6. The method as recited in claim 4 further comprising loading the support vector machine classifier model to the support vector machine classifier.

7. The method as recited in claim 1, further comprising repeating the parsing, the filtering, and the generating with the second part of the couplet as the search term.

8. The method as recited in claim 7, wherein the first part of the couplet is in a first language and the second part of the couplet is in a second language and matches a semantic meaning of the first part.

9. A computer-readable storage medium storing computer-executable instructions that, when executed by a computer, cause the computer to perform a method comprising:
   generating a set of snippets based on parsing a search result resulting from a query based on a search term comprising a first part of a couplet that comprises the first part and a second part, wherein each of the first part and the second part include at least one character or word, and wherein each of the generated set of snippets is selected from at least one returned character or word that matches the query and information associated with the query and a suggested new search term for a subsequent query;
   subjecting the generated set of snippets to at least one filter to generate at least one candidate couplet part, wherein the at least one filter is associated with characteristics of the search term; and
   generating at least one output couplet part by classifying the at least one candidate couplet part with a support vector machine classifier.

10. A method for web mining at least one couplet part, the method comprising:
   processing, by a computer, a search term of a query, wherein the search term comprises a first sentence of a Chinese couplet using a search engine resulting in a search result, and wherein the Chinese couplet comprises the first sentence and a second sentence;
   parsing, by the computer, the search result resulting from the processing, wherein the parsing results in a snippet set that is selected from at least one sentence that matches the query and information associated with the query and a suggested new search term for a subsequent query;

filtering, by the computer, the snippet set resulting in at least one candidate sentence for the Chinese couplet; and generating, by at least a support vector machine classifier, at least one new sentence suitable for the Chinese couplet from the at least one candidate sentence.

11. The method as recited in claim 10 wherein the Chinese couplet comprises the first sentence and the second sentence.

12. The method as recited in claim 10 wherein the filtering the snippet set comprises dividing up text in at least one snippet of the snippet set into sentences based on punctuation.

13. The method as recited in claim 12 wherein the sentences are grouped in pairs to form sentence pairs.

14. The method as recited in claim 13 wherein the filtering is performed by:
   an identity filter configured to discard any one of the snippet set that does not include the first sentence of the Chinese couplet and a returned second sentence;
   a neighbor filter configured to pass through the returned second sentence of the sentence pairs not discarded by the identity filter;
   a length filter configured to discard any one of the returned second sentences passed through by the neighbor filter and that does not have sentence length that corresponds to the first sentence of the Chinese couplet.

15. The method as recited in claim 14 wherein the generating the at least one new sentence comprises training the support vector machine classifier with a set of manually labeled Chinese couplets resulting in a support vector machine classifier model.

16. The method as recited in claim 15 wherein the set of manually labeled Chinese couplets are based on features unique to the first sentence of the Chinese couplet.

17. The method as recited in claim 16 wherein the features comprise a sentence length, a tone, a sequence, a content, and a writing style of the Chinese couplet.

18. The method as recited in claim 16 further comprising loading the support vector machine classifier model to the support vector machine classifier.

19. The method as recited in claim 10, further comprising repeating the processing, the parsing, the filtering, and the generating with the second sentence of the Chinese couplet.

* * * * *